(12) United States Patent
Westcott et al.

(10) Patent No.: US 8,255,011 B2
(45) Date of Patent: Aug. 28, 2012

(54) MOBILE COMMUNICATION DEVICE AND COMMUNICATION METHOD

(75) Inventors: Bryan Lloyd Westcott, Rockwall, TX (US); Scott Burkart, Royse City, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 460 days.

(21) Appl. No.: 12/434,192

(22) Filed: May 1, 2009

(65) Prior Publication Data

US 2010/0279745 A1 Nov. 4, 2010

(51) Int. Cl.
*H04B 1/38* (2006.01)
(52) U.S. Cl. ........................ 455/574; 455/458
(58) Field of Classification Search .................. 455/574, 455/458
See application file for complete search history.

(56) References Cited

U.S. PATENT DOCUMENTS

| | | | | |
|---|---|---|---|---|
| 5,974,552 | A * | 10/1999 | Lim et al. | 713/300 |
| 7,027,773 | B1 * | 4/2006 | McMillin | 455/41.2 |
| 7,072,697 | B2 * | 7/2006 | Lappetelainen et al. | 455/574 |
| 2006/0270382 | A1 * | 11/2006 | Lappetelainen et al. | 455/343.2 |

* cited by examiner

*Primary Examiner* — Jean B Jeanglaude
(74) *Attorney, Agent, or Firm* — Hovey Williams LLP

(57) ABSTRACT

A mobile communication device includes a processor; a data acquisition device for acquiring data and providing it to the processor; a transceiver for transmitting at least some of the acquired data to an external device; and a low-power clock. The low-power clock counts down a random delay time period and temporarily shifts the processor and the transceiver from low-power sleep modes to active wake modes so that the processor and transceiver can transmit at least some of the acquired data to the external device while in their active wake modes.

21 Claims, 3 Drawing Sheets

MOBILE COMMUNICATION DEVICE AND COMMUNICATION METHOD

RELATED APPLICATIONS

This application relates to co-pending applications entitled "SYSTEMS AND METHODS FOR GENERATING PULSED OUTPUT SIGNALS USING A GATED RF OSCILLATOR CIRCUIT," Ser. No. 12/387,490, filed on May 1, 2009; "SYSTEMS AND METHODS FOR RFID TAG OPERATION," Ser. No. 12/387,460, filed on May 1, 2009; "PULSE LEVEL INTERLEAVING FOR UWB SYSTEMS," Ser. No. 12/387,425, filed on May 1, 2009; and "DATA SEPARATION IN HIGH DENSITY ENVIRONMENTS," Ser. No. 12/387,485, filed on May 1, 2009. These applications are hereby incorporated by reference in their entirety.

BACKGROUND

The present invention relates to mobile communication devices and communication methods. More particularly, the invention relates to such a device and method that permit bi-directional communication between a mobile device and a central radio without requiring the mobile device to continuously operate its power-consuming RF front end and without the need for an accurate, power-consuming clock in the mobile device.

Wireless communication systems require some sort of multiplexing to allow several radios to simultaneously transmit and receive communications over a single communication channel. Such multiplexing may be provided by code division multiple access (CDMA), time division multiple access (TDMA), frequency division multiple access (FDMA), and other channel access methods. These and other communication methods and protocols work well for radios that do not have power limitations, but they do not work as well for applications where the radios cannot be readily recharged because they require the radios to continuously or periodically "listen" for communications, and such listening consumes a great deal of power by the radios' RF front ends.

One prior art communication method attempts to solve this problem by synchronizing or scheduling the communications between a mobile radio and a central radio so that the mobile radio only has to turn on its RF front end and transmit and receive communications periodically according to a fixed schedule. For example, a mobile radio that is primarily used to report data to a central radio and occasionally receive instructions back from the central radio may be scheduled to turn on every 8 hours (or any other time interval). Although this reduces the power consumption of the mobile radio's RF front end, it necessitates the use of highly accurate and power-consuming clocks at both the central radio and the mobile radio to maintain the synchronization between the radios. Such clocks are expensive and further drain the battery of the mobile radio.

SUMMARY

The present invention solves the above-described problems and provides a distinct advance in the art of mobile communication devices and communication methods. More particularly, the present invention provides a mobile communication device and communication method that permit bi-directional communication between a mobile device and a central radio without requiring the mobile device to continuously operate its power-consuming RF front end and without the need for an accurate, power-consuming clock in the mobile device.

The invention may be implemented with a communication system that includes at least one central radio and a plurality of mobile communication devices. Some embodiments of the system may also include one or more secondary communication devices that may communicate with one of the mobile communication devices. The central radio, mobile communication devices, and secondary communication devices may exchange data or otherwise communicate via any known communications networks or methods including cell phone networks, WiFi (802.11), Wi-Max, Bluetooth™, ultra-wideband (UWB), infrared, and/or combinations of these and other common methods and networks. Embodiments of the invention are particularly suited for data transfer or other communications between one or more central radios that have no power or processing constraints and a multitude of relatively low-complexity radios that require low power use to conserve battery life. For example, the mobile communication devices may be radio frequency identification devices (RFIDs) used to gather data and occasionally transmit the data back to the central radio as explained in more detail below.

The present invention supports bi-directional communication between the central radio and the mobile communication devices while preserving the mobile communication devices' batteries by switching the mobile communication devices to low-power sleep modes and waking them only after expiration of a random delay time period. The system may support any number of mobile communication devices by simply adjusting a maximum value for the random delay time period, where the number of mobile communication devices is proportional to the maximum random delay time period and inversely proportional to the throughput and latency of each mobile communication device. For example, when a relatively few number of mobile communication devices are used and/or when the mobile communication devices must frequently transmit and receive data, the maximum random delay time period may be a short time period. Conversely, when a relatively larger number of mobile communication devices are used and/or when the mobile communication devices only require infrequent and short communications, the maximum random delay time period may be much longer. Because the delay time is random, the mobile communication devices wake and transmit data at different times, thus permitting may mobile communication devices to co-exist on a single communication channel.

In one embodiment, each mobile communication device comprises a processor, a data acquisition device for acquiring data and providing it to the processor, a transceiver for transmitting at least some of the acquired data to an external device such as the central radio, and a low-power clock. The processor and transceiver are initially switched to low-power sleep modes to conserve battery life as mentioned above. The clock counts down a random delay time period and at the expiration thereof temporarily shifts the processor and the transceiver to active wake modes so that the processor and transceiver can transmit at least some of the data to the external device. The processor and transceiver are configured to remain in their active wake mode for a pre-determined wake period to receive communications back from the external device and to shift back to their low-power sleep mode upon expiration of the pre-determined wake period.

Some embodiments of the invention also permit communications between the central radio and the mobile communication devices independent of the random delay time periods. For example, some of the mobile communication devices may include a low-power wake-up circuit operable to receive a wake signal from the central radio and shift its processor and transceiver to their active wake modes independent of the random delay time period. This permits the central radio to wake some of the mobile communication devices when the central radio requires communications before expiration of the random delay time period. The wake-up circuit may incorporate security measures to prevent unintentional or malicious attempts to waken the mobile radio and thus drain its battery. For example, the wake-up circuit may include a band pass filter for passing only selected frequencies of received signals to identify the desired wake-up signal. The wake-up circuit may also include a decoder for decoding the wake signal and switching the processor and transceiver to their active wake modes only when a particular code is detected. The wake-up circuit may also be configured to receive frequency-hopped spread spectrum signals to reduce the interceptability and/or detectability of the central radio, for example by using a square-law diode circuit.

The mobile communication devices may also wake themselves independently of the random delay time period when critical data is received. This may be done by decreasing a mobile communication device's random delay time period when it has information that needs to be immediately reported to the central radio.

Some of the mobile communication devices may also exchange data with or otherwise communicate with one or more secondary communication devices as mentioned above. Synchronization between a mobile communication device and its secondary communication devices may be achieved by having the secondary communication devices waken and then send a wake signal to the mobile communication device's wake-up circuit. Coarse time synchronization may also be achieved with low-power clocks in both the mobile communication device and its secondary communication devices. Clock errors may be compensated for by having the secondary communication devices re-transmit multiple copies of the same frame, each with unique headers so that the mobile communication device can detect clock drift between the radios and re-calibrate for the next communication cycle.

Another embodiment of the invention is a method of exchanging communications between a central radio and at least one mobile radio. The method counts down a random delay time in a mobile radio, and upon expiration of the random delay time, switches a processor and transceiver in the mobile radio from low-power sleep modes to active wake modes. While the processor and transceiver are in their active wake modes, the mobile communication device transmits data to the central radio and receives communications back from the central radio. Once the communications are complete, the processor and the transceiver of the mobile communication device are switched back to their low-power sleep modes.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
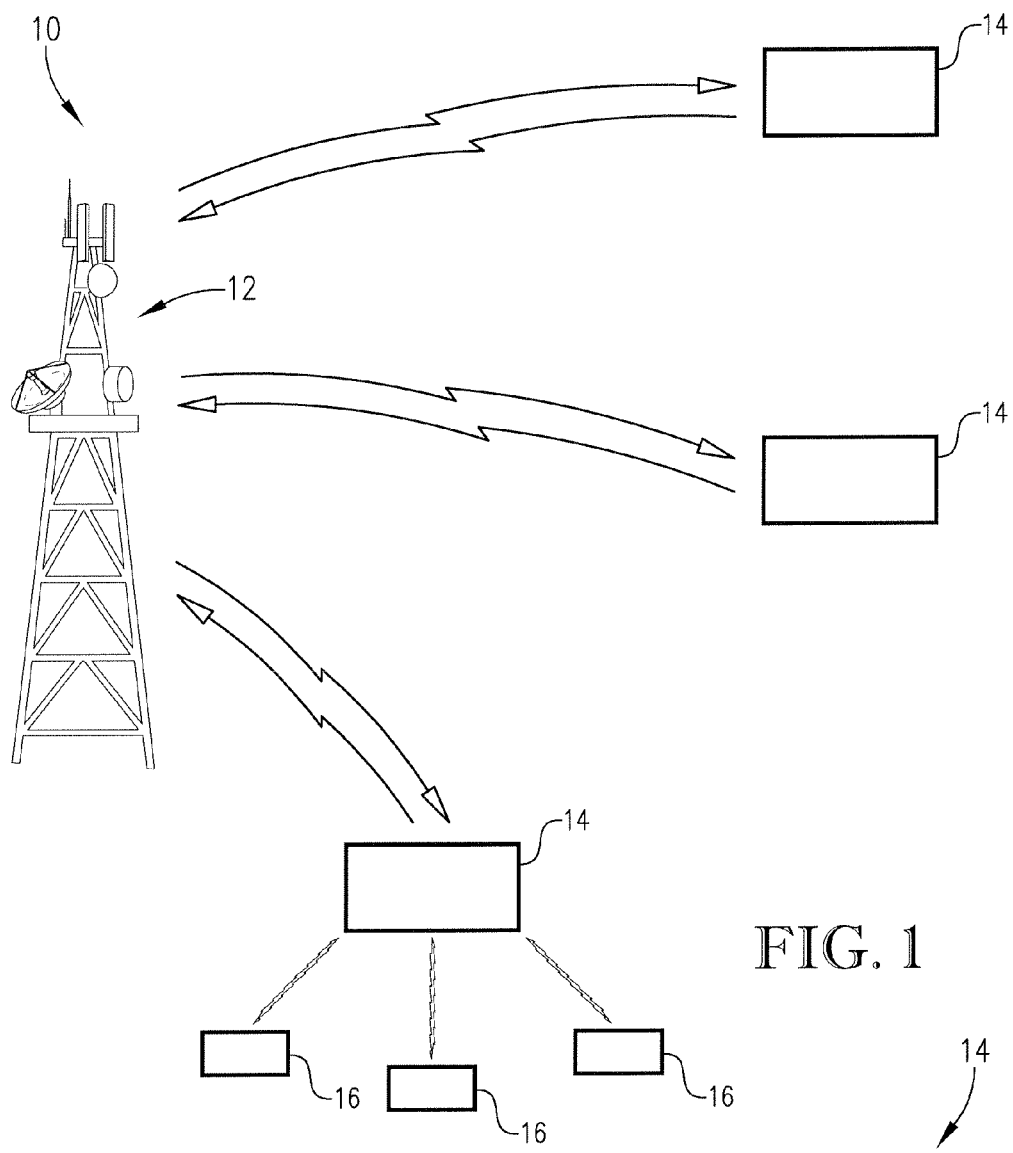
FIG. 1 is a schematic diagram of components in a communication system in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

Turning now to the drawing figures, and particularly FIG. 1, a communications system 10 that may be used to implement embodiments of the invention is illustrated. The communications system 10 may include at least one central radio 12, a plurality of mobile communication devices 14, and one or more secondary communication devices 16 that may communicate with one of the mobile communication devices 14. The central radio 12, mobile communication devices 14, and stationary electronic communication devices 16 may exchange data or otherwise communicate via any known communications networks or methods including cell phone networks, WiFi (802.11), Wi-Max, Bluetooth™, ultra-wideband (UWB), infrared, and/or combinations of these and other common methods and networks. Embodiments of the invention are particularly suited for data transfer or other communications between one or more central radios that have no power or processing constraints and a multitude of relatively low-complexity radios that require low power use to conserve battery life. For example, the mobile communication devices may be radio frequency identification devices (RFIDs), used to gather data and occasionally transmit the data back to the central radio as explained in more detail below.

Communications between the central radio 12 and mobile communication devices 14 may be encrypted using either symmetric encryption or public-key infrastructure encryption, which also allows the communications to contain cryptographic signatures.

The present invention supports bi-directional communication between the central radio 12 and the mobile communication devices 14 while preserving the mobile communication devices' batteries by switching the mobile communication devices 14 to low-power sleep modes and waking them only after expiration of random delay time periods. The system may support any number of mobile communication devices by simply adjusting a maximum value for the random delay time period, where the number of mobile communication devices is proportional to the maximum random delay time period and inversely proportional to the throughput and latency of each mobile communication device. For example, when a relatively few number of mobile communication devices are used and/or when the mobile communication devices must frequently transmit and receive data, the maximum random delay time period may be a short time period. Conversely, when a relatively larger number of mobile communication devices are used and/or when the mobile communication devices only require infrequent and short communications, the maximum random delay time period may be much longer. Although any maximum random delay time period may be used, a maximum of 5 minutes to 180 minutes is desirable for most applications. The central radio may also adjust the maximum random delay time period and send the new maximum value to all the mobile communication devices to accommodate more or fewer mobile communication devices.

The central radio 12 includes conventional transmitters, receivers, and communication equipment and may be mounted to a stationary tower as illustrated. As mentioned above, the central radio 12 may transmit data and communications to and receive data and communications from the mobile communication devices 14 via any communication network or method. In one embodiment, the central radio 12 is part of a cellular telephone network and transmits data via narrowband CDMA or TDMA cellular radio signals and receives data from the mobile communication devices 14 via ultra-wideband CDMA or TDMA signals.

Figure 2:
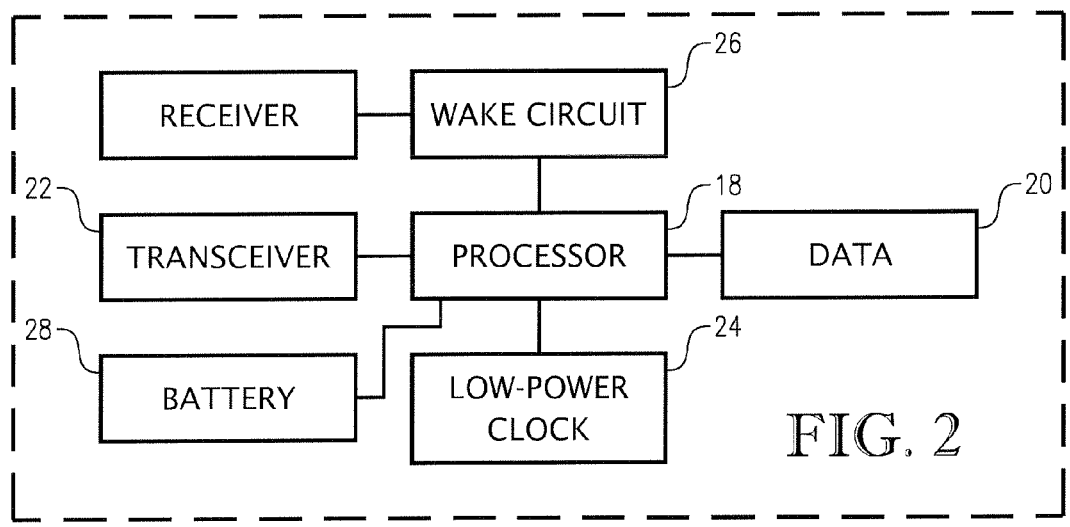
FIG. 2 is a block diagram showing selected components of a mobile communication device constructed in accordance with an embodiment of the invention.

The mobile communication devices 14 may be any communication devices capable of exchanging data or other communications with the central radio 12. One embodiment of a mobile communication device is illustrated in FIG. 2 and includes a processor 18, a data acquisition device 20, a transceiver 22, a low-power clock 24, a wake-up circuit 26, and a battery 28.

The processor 18 may include any number of processors, controllers, integrated circuits, programmable logic devices, or other computing devices and resident or external memory for storing data and other information accessed and/or generated by the mobile communication device 14. The processor is preferably coupled with the other components of the mobile communication device through wired connections, such as a data bus, to enable information to be exchanged between the various components. However, the components need not be physically connected to one another since wireless communication among the various depicted components is permissible and intended to fall within the scope of the present invention.

The processor 18 may implement a computer program and/or code segments to perform some of the functions described herein. The computer program may comprise an ordered listing of executable instructions for implementing logical functions in the processor. The computer program can be embodied in any computer-readable medium for use by or in connection with an instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a random access memory (RAM), a read-only memory (ROM), an erasable, programmable, read-only memory (EPROM or Flash memory), a portable computer diskette, and a portable compact disk read-only memory (CDROM).

The data acquisition device 20 may include any device or devices that sense or gather data such as a temperature sensor, a location sensor, a signal sensor, a sound detector, or a motion sensor. The data acquisition device 20 may also include other components that store, transmit, or otherwise manipulate the gathered data. For example, in one embodiment, the data acquisition device may include a temperature sensor and memory for sensing and storing multiple temperature readings over a period of time. In another embodiment, the data acquisition device may include a GPS, GLONASS, or GALILEO enabled receiver, memory, and other related circuitry for sensing and storing multiple location coordinates of the device over a period of time. In yet another embodiment, the data acquisition device may include a signal sensor and memory for sensing and recording communication signals. The scope of the invention is not limited to these particular examples of the data acquisition device, as any other sensors and sensor technology may be incorporated in the mobile communication device 14.

The transceiver 22 may be any device capable of wirelessly transmitting and receiving data and other communications. The transceiver may be a combined transmitter and receiver or may include a separate transmitter and receiver. The transceiver includes an antenna, conventional RF front end components, and intermediate frequency (IF) components. The transcevier may communicate via any known communications networks or methods including cell phone networks, WiFi (802.11), Wi-Max, Bluetooth™, ultra-wideband (UWB), infrared, and/or combinations of these and other common methods and networks.

The low-power clock 24 may be any low-power timer or clock such as a 32.768 kHz crystal oscillator. As explained in more detail below, the low-power clock is used to countdown a random time delay period for the mobile communication device.

The wake-up circuit 26 is provided for waking the mobile communication device 14 independent of the random delay time period by receiving a wake signal from the central radio and shifting its processor and transceiver to their active wake modes. This permits the central radio to wake the mobile communication device when the central radio requires communications before expiration of the random delay time period.

The wake-up circuit 26 may incorporate security measures to prevent unintentional or malicious attempts to waken the mobile radio and thus drain its battery. For example, the wake-up circuit may include a band pass filter for passing only selected frequencies of received signals to identify the desired wake-up signal. The wake-up circuit may also include a decoder for decoding the wake signal and switching the processor and transceiver to their active wake modes only when a particular code is detected. The wake-up circuit may also be configured to receive frequency-hopped spread spectrum signals to reduce the interceptability and/or detectability of the central radio, for example by using a square-law diode circuit. The central radio 12 may change the wake code or signal every time it wakes up a mobile communication device 14 to further reduce the likelihood of tampering. The new code may be provided in communications from the central radio or may change according to some pseudo-random sequence. The verification or decoding functions of the wake-up circuit may be performed by a separate circuit of discreet components such as a shift register comparator or these functions may be partially or fully performed by the processor 18.

The battery 28 may be any type of energy storage device such as a lithium battery, atomic battery, alkaline battery, or even a paper battery. Because an embodiment of the device 10 may be environmentally sealed, the battery may be a single-use, non-rechargeable battery.

Each mobile communication device 14 may also include a display coupled with the processor for displaying various information corresponding to the device. The display may comprise conventional black and white, monochrome, or color display elements including, but not limited to, Liquid Crystal Display (LCD), Thin Film Transistor (TFT) LCD, Polymer Light Emitting Diode (PLED), Organic Light Emitting Diode (OLED) and/or plasma display devices.

Each mobile communication device 14 may also include memory integral with the processor 18, stand-alone memory, or a combination of both. The memory may include, for example, removable and non-removable memory elements such as RAM, ROM, Flash, magnetic, optical, USB memory devices, and/or other conventional memory elements. The memory may store various data associated with operation of the mobile communication device 14a, such as the computer program and code segments mentioned above, or other data for instructing the processor and other device elements to perform the steps described herein.

Each mobile communication device 14 may also include a user interface that permits a user to operate the device. The user interface may comprise one or more functionable inputs such as buttons, switches, scroll wheels, a touch screen associated with the display, voice recognition elements such as a microphone, pointing devices such as mice, touchpads, trackballs, styluses, etc. some of the mobile communication devices 14 may also include a speaker for providing audible instructions and feedback.

The components of each mobile communication device may be housed within a housing of any size and constructed of any suitable materials. The housing may be handheld or otherwise portable to facilitate easy transport of the device. The housing is preferably constructed from a suitable lightweight and impact-resistant material such as, for example, plastic, nylon, aluminum, or any combination thereof and may include one or more appropriate gaskets or seals to make it substantially waterproof or resistant. The housing may take any suitable shape for size, and the particular size, weight and configuration of the housing may be changed without departing from the scope of the present invention. In some embodiments, the components of one of the mobile communication devices 14 may be mounted in an enclosure that also houses other tracking, surveillance, data acquisition, or other similar electronic components and circuits.

The above-described communication system 10 may be used to implement a method of exchanging bi-directional communications between the central radio 12 and at least one of the mobile communication devices 14 without requiring the mobile communication device to continuously operate its power-consuming RF front end or include an accurate, power-consuming clock. The method broadly comprises the steps of counting down a random delay time with a low-power clock in the mobile communication device, and upon expiration of the random delay time, switching the mobile communication device's processor and transceiver from low-power sleep modes to active wake modes. While the processor and transceiver are in their active wake modes, the mobile communication device transmits data to the central radio and receives communications back from the central radio. Thereafter, the mobile communication device switches its processor and transceiver back to their low-power sleep modes and begins counting down a new random delay time period. Methods for waking the mobile communication devices independent of the random delay time period are also provided.

Figure 3:
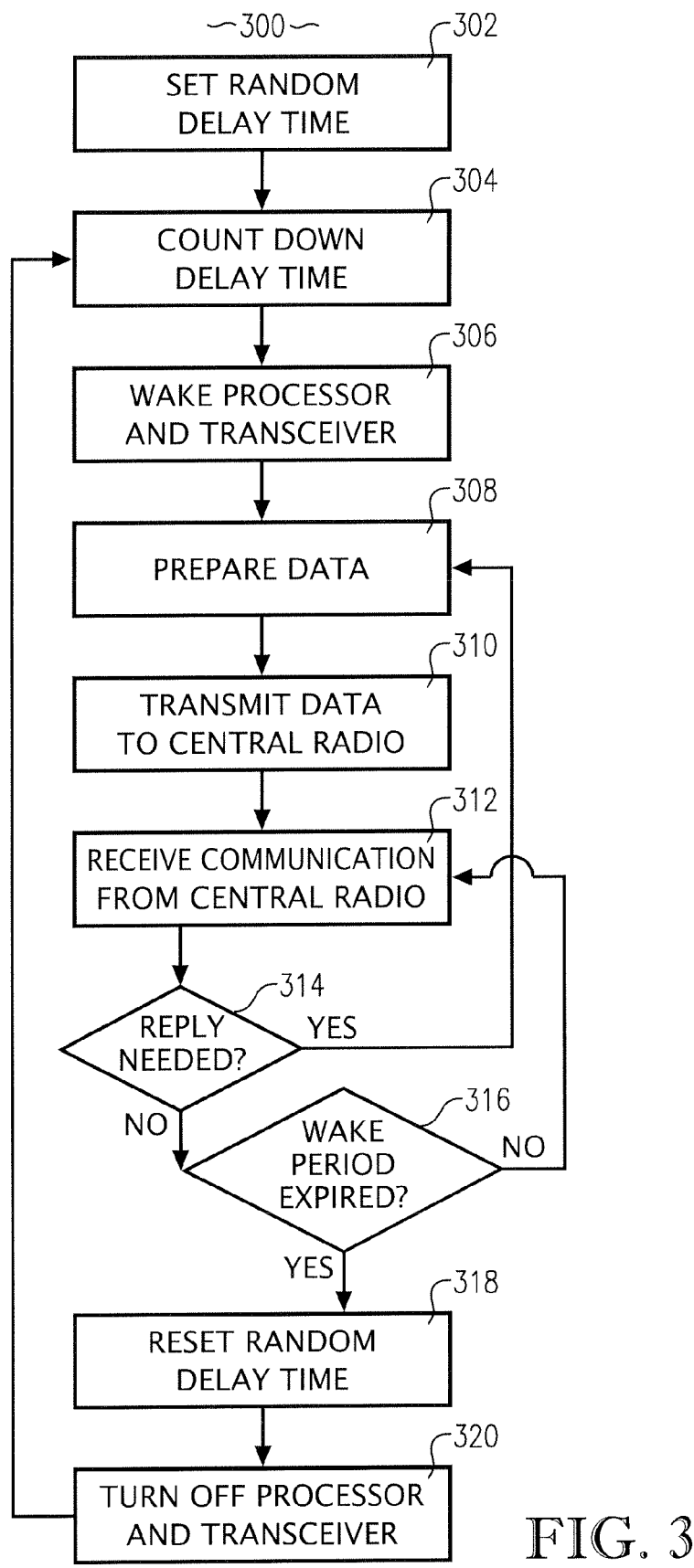
FIG. 3 is a flow diagram depicting an exemplary method of the present invention.
Figure 4:
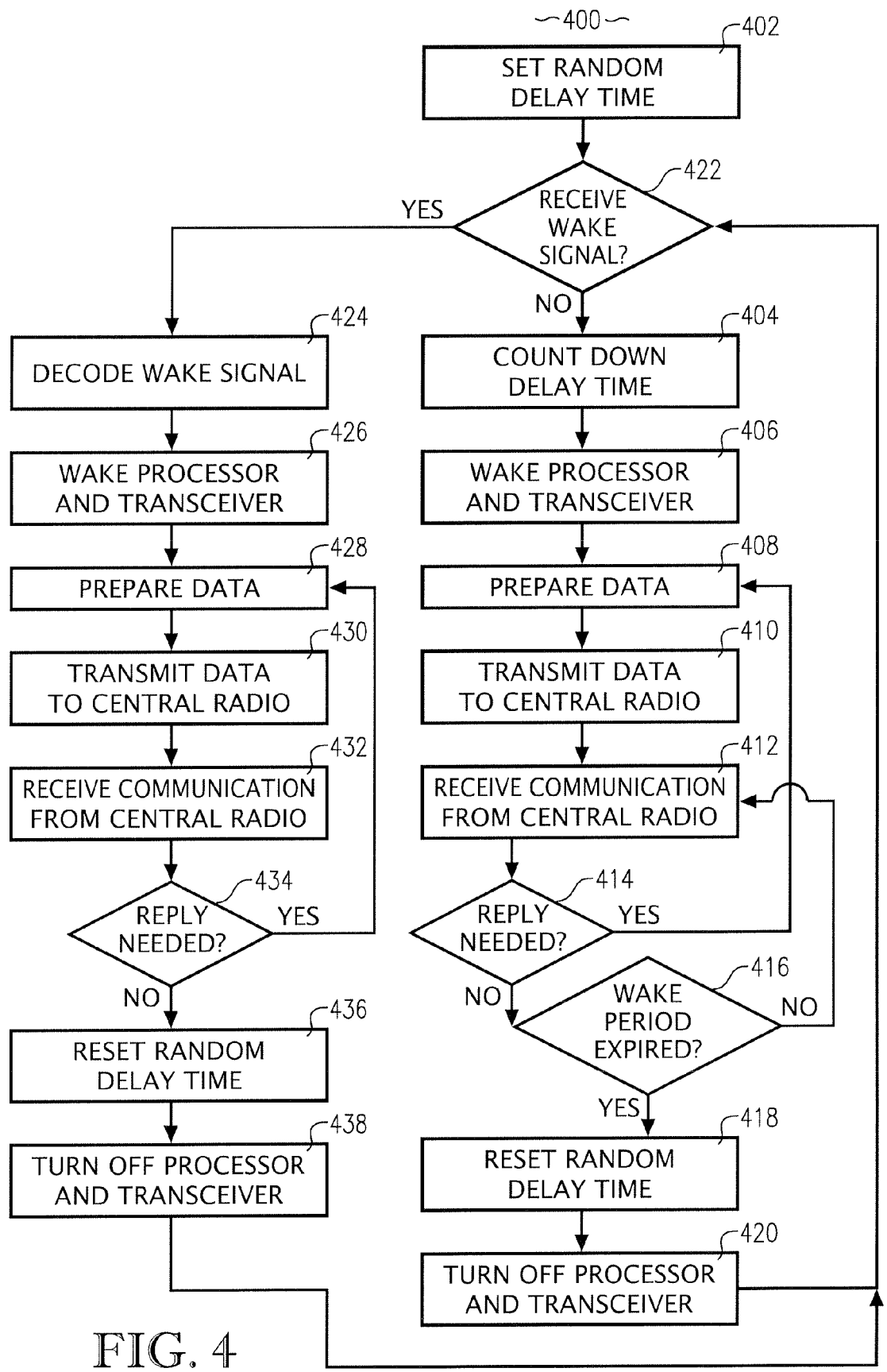
FIG. 4 is a flow diagram depicting another exemplary method of the present invention.

The flow charts of FIGS. 3 and 4 depict the steps of exemplary methods of the invention in more detail. In this regard, some of the blocks of the flow chart may represent a module segment or portion of code of the computer programs stored in or accessible by the processor. In some alternative implementations, the functions noted in the various blocks may occur out of the order depicted in FIGS. 3 and 4. For example, two blocks shown in succession in FIGS. 3 or 4 may in fact be executed substantially concurrently, or the blocks may sometimes be executed in the reverse order depending upon the functionality involved.

FIG. 3 depicts the steps of a communication method 300 or protocol between one of the mobile communication devices 14 and the central radio 12 where the radios are synchronized with a random delay time period. At the beginning of the method, the mobile communication device's processor and transceiver are in their low-power sleep modes to conserve battery life. The processor and transceiver are switched to their active modes only after expiration of a random delay time period. The random delay time period is first established or otherwise obtained as shown in step 302. As mentioned above, the random delay time period can be any time period up to the maximum random delay time period selected for the communication system 10. In one embodiment, the mobile communication device's processor 18 randomly selects the random delay time period. In other embodiments, the central radio transmits a random delay time period to the mobile communication device while communications are established between the radios, and that random delay time period is used for the next sleep cycle of the mobile communication device.

The low-power clock 24 in the mobile communication device then begins counting down the random delay time period as shown in step 304 and wakes its processor 18 and transceiver 22 at the expiration of the random delay time period as shown in step 306. The processor and transceiver may be woken and shifted to their active modes by any conventional circuitry.

Once in its active mode, the processor prepares any data that needs to be sent to the central radio as shown in step 308 and then transmits the data to the central radio as shown in step 310. The processor 18 may acquire the data from the data acquisition device 20 or any other source.

When the central radio 12 receives data from the mobile communication device 14, it knows the mobile communication device is "awake" and ready to receive data back from the central radio. Thus, the central radio transmits instructions or other data back to the mobile communication device as shown in step 312. The processor and transceiver of the mobile communication device stay in their active modes for a predetermined wake period in order to receive instructions or other data back from the central radio. The wake period may be any length, and in one embodiment is between 5 and 30 milliseconds.

Once the mobile communication device receives instructions or other data from the central radio, the processor of the mobile communication device determines whether it needs to reply to the received data as shown in step 314. If it does, the method loops back through steps 308-312 to enable further communications between the mobile communication device and the central radio. For example, the central radio may issue a command to the mobile communication device, and the mobile communication device may send back an acknowledgment and/or an indication that the commanded task was completed.

If no reply is needed in step 314, the method continues to step 316 to determine if the pre-determined wake period has expired. If it hasn't, the method returns to step 312 to continue listening for further communications from the central radio. Once the wake period expires, the mobile communication device resets its random delay time period as shown in step 318 and switches its processor and transceiver to their low-power sleep modes as depicted in step 320. The method then returns to step 304 to count down the new random delay time period before renewing communications with the central radio.

FIG. 4 depicts the steps of a communication method 400 or protocol between one of the mobile communication devices 14 and the central radio 12 where the radios are synchronized via the random delay time period described above or a wake sequence that is independent of the random delay time period. As with the method shown in FIG. 3, the mobile communication device's processor and transceiver are initially in their low-power sleep modes to conserve battery life.

Steps 402 to 420 of the method 400 are essentially identical to steps 302 to 320 of the method 300. The method 400 also includes steps 422 to 438 for invoking the mobile communication device's wake-up circuit 26. Specifically, the central radio 12 may transmit a wake signal to the mobile communication device at any time and shift the mobile communication device's processor and transceiver to their active modes independent of the random delay time period.

In more detail, step 422 determines whether the mobile communication device has received a wake signal from the central radio. If not, the method proceeds to step 404 to count down the random delay time period as described above. However, if a wake signal was received in step 422, the method proceeds to step 424 to decode or otherwise verify the authenticity of the wake signal. As mentioned above, this may be done by various security measures within the mobile communication device.

After the wake signal has been verified, the mobile communication device's processor and transceiver are shifted to their active modes as depicted by step 426. Once in its active mode, the processor prepares any data that needs to be sent to the central radio as shown in step 428 and then transmits the data to the central radio as shown in step 430. The data may be acquired from the data acquisition device or any other source.

Once the central radio receives the data from the mobile communication device, it knows that the mobile communication device is temporarily "awake" and ready to receive data. Thus, the central radio may transmit any instructions or other data back to the mobile communication device as shown in step 432.

The processor of the mobile communication device then determines whether it needs to reply to the received data as shown in step 434. If it does, the method loops back through steps 428 to 432 to enable further communications between the mobile communication device and the central radio.

If no reply is needed in step 434, the mobile communication device resets its random delay time period as shown in step 436 and switches its processor and transceiver to their low-power sleep modes as depicted in step 438. The method then returns to step 422 to either wait for receipt of another wake signal or to count down the new random delay time period before renewing communications between the mobile communication device and the central radio.

Although not depicted in FIGS. 3 and 4, some of the mobile communication devices may also wake themselves independently of their random delay time periods and wake-up circuits when critical data is received from their data acquisition devices 20 or other sources. A mobile communication device's processor may do this by decreasing its random delay time period when it has information that needs to be immediately reported to the central radio.

Some of the mobile communication devices 14 may also exchange data with or otherwise communicate with one or more of the secondary communication devices 16. Synchronization between a mobile communication device 14 and its secondary communication devices 16 may be achieved by having the secondary communication devices waken and then send a wake signal to the mobile communication device's wake-up circuit. Coarse time synchronization may also be achieved with low-power clocks in both the mobile communication device and its secondary communication devices. Clock errors may be compensated for by having the secondary communication devices re-transmit multiple copies of the same frame, each with unique headers so that the mobile communication device can detect clock drift between the radios and re-calibrate for the next communication cycle. Additionally, it is possible for the mobile radio to receive transmissions from the secondary radio without the need for the secondary radio to use the wake circuit. The mobile radio would keep two separate sleep timers (one for communication with the central radio and one for communication with the secondary radio), it would then sleep for the minimum of the two timers. When it wakes up, it either listens for the secondary radio or communicates with the central tower based on which timer was used. Since this alternate method requires synchronization between the mobile and secondary radios (which aren't using accurate clocks), a larger wake-up window can be used. If the secondary radio transmission was not received in the wake period, the next sensor reading wake time will be increased (and the next sensor sleep time will be reduced). Every time a secondary radio transmission is not received in the wake period, the secondary radio wake time is increased and the secondary radio sleep time is decreased. The upper limit on this increase should be when the mobile radio is listening for the entire period between sensor transmissions (this may be impractical for battery life when the delay between transmissions from the secondary radio is particularly large.) The repeated transmissions from the secondary radio will help mitigate the synchronization problems. If a given number of consecutive readings from the secondary radio fail, the mobile radio may stop listening for the secondary radio (since every increase of the wake time will further drain the battery.) It is possible that the secondary radio transmission was not received because it has malfunctioned, has been damaged, can no longer be heard by the mobile radio, has run out of battery power, or has become severely out of synch with the mobile radio.

Although the invention has been described with reference to the preferred embodiment illustrated in the attached drawing figures, it is noted that equivalents may be employed and substitutions made herein without departing from the scope of the invention as recited in the claims. For example, the particular components illustrated and described herein are merely examples of components that may be used to implement the present invention and may be replaced with other components without departing from the scope of the invention.

Having thus described the preferred embodiment of the invention, what is claimed as new and desired to be protected by Letters Patent includes the following:

1. A mobile communication device comprising:
 a processor;
 a data acquisition device for acquiring data and providing it to the processor;

a transceiver for communicating with a central radio and a secondary communications device;

a first timer for counting down a first random delay time period and for temporarily shifting the processor and the transceiver from low-power sleep modes to active wake modes upon countdown of the first random delay time period so that the processor and transceiver can transmit at least some of the data to the central radio while in their active wake modes, wherein the first random delay time period is received from the central radio via the transceiver; and a second timer for counting down a second random delay time period and for temporarily shifting the processor and the transceiver from low-power sleep modes to active wake modes upon countdown of the second random delay time period so that the processor and transceiver can communicate with the secondary communications device while in their active wake modes.

2. The mobile communication device as set forth in claim 1, wherein the processor and transceiver are configured to remain in their active wake modes for a pre-determined wake period and to shift back to their low-power sleep modes upon expiration of the wake period.

3. The mobile communication device as set forth in claim 1, the data acquisition device comprising a temperature sensor, a location sensor, a signal sensor, a sound detector, or a motion sensor.

4. The mobile communication device as set forth in claim 1, further including a low-power wake-up circuit operable to receive a wake signal from the central radio or the secondary communications device and shift the processor and the transceiver to their active wake modes independent of the first and the second random delay time periods.

5. The mobile communication device as set forth in claim 4, the wake-up circuit including a receiver and a band pass filter for passing only selected frequencies of the wake signal and attenuating frequencies outside the selected frequencies.

6. The mobile communication device as set forth in claim 4, the low-power wake-up circuit further including a decoder for decoding the wake signal and switching the processor and transceiver to their active wake modes only when a particular code is detected.

7. The mobile communication device as set forth in claim 1, further including memory for storing the data acquired by the data acquisition device.

8. The mobile communication device as set forth in claim 1, further including a battery for powering the processor, data acquisition device, transceiver, and low-power clock.

9. The mobile communication device as set forth in claim 8, further including an environmentally sealed enclosure for housing the processor, data acquisition device, transceiver, low-power clock, and battery.

10. A mobile communication device comprising:
a processor having a low-power sleep mode and an active wake mode;
a data acquisition device for acquiring data and providing it to the processor;
a transceiver for communicating with a central radio and a secondary communications device transceiver having a low-power sleep mode and an active wake mode;
a first timer for counting down a first random delay time period and for shifting the processor and the transceiver from their low-power sleep modes to their active wake modes upon countdown of the first random delay time period so that the processor and transceiver can transmit at least some of the acquired data to the central radio while in their active wake modes;
a second timer for counting down a second random delay time period and for shifting the processor and the transceiver from their low-power sleep modes to their active wake modes for a wake time period upon countdown of the second random delay time period so that the processor and transceiver can communicate with the secondary communications device while in their active wake modes, wherein if a secondary radio transmission is not received during the wake time period, the wake time period is increased and the second random delay time period is decreased; and
a low-power wake-up circuit operable to receive a wake signal from the central radio and shift the processor and the transceiver to their active wake modes independent of the first and second random delay time periods.

11. The mobile communication device as set forth in claim 10, wherein the processor and transceiver are configured to remain in their active wake modes for a pre-determined wake period upon waking after the first random delay time period and to shift back to their low-power sleep modes upon expiration of the pre-determined wake period.

12. The mobile communication device as set forth in claim 10, the data acquisition device comprising a temperature sensor, a location sensor, a signal sensor, a sound detector, or a motion sensor.

13. The mobile communication device as set forth in claim 10, the wake-up circuit including a receiver and a band pass filter for passing only selected frequencies of the wake signal and attenuating frequencies outside the selected frequencies.

14. The mobile communication device as set forth in claim 10, the wake-up circuit further including a decoder for decoding the wake signal and switching the processor and transceiver to their active wake modes only when a particular code is detected.

15. The mobile communication device as set forth in claim 10, further including memory for storing the data acquired by the data acquisition device.

16. The mobile communication device as set forth in claim 10, further including an environmentally sealed enclosure for housing the processor, data acquisition device, transceiver, the first timer, and the second timer.

17. A method of exchanging communications between a central radio and at least one mobile radio, the method comprising:
counting down a random delay time in the mobile radio, the random delay time period received by the mobile radio from the central radio;
upon expiration of the random delay time, switching a processor and transceiver in the mobile radio from low-power sleep modes to active wake modes;
while the processor and transceiver are in their active wake modes, transmitting data from the mobile radio to the central radio and receiving communications at the mobile radio from the central radio, the communications including a new random delay time period; and
switching the processor and the transceiver back to their low-power sleep modes.

18. The method as set forth in claim 17, further comprising the steps of maintaining the processor and transceiver in their active wake modes for a pre-determined wake period to receive communications from the central radio and shifting the processor and the transceiver back to their low-power sleep modes upon expiration of the pre-determined wake period.

19. The method as set forth in claim 17, further comprising the steps of receiving a wake signal with a low-power wake-up circuit and shifting the processor and the transceiver to their active wake modes independent of the random delay time period.

20. The mobile communication device as set forth in claim 19, the wake-up circuit including a receiver with a band pass filter for passing only selected frequencies of the wake signal and attenuating frequencies outside the selected frequencies.

21. The method as set forth in claim 19, the low-power wake-up circuit further including a decoder for decoding the wake-up signal and switching the processor and transceiver to their active wake modes only when a particular code is detected.

* * * * *